(12) United States Patent
Graves et al.

(10) Patent No.: US 9,898,017 B2
(45) Date of Patent: Feb. 20, 2018

(54) THERMOSTATIC MIXING VALVE

(71) Applicant: Acorn Engineering Company, City of Industry, CA (US)

(72) Inventors: James C. Graves, Lake Bluff, IL (US); Dejan Zivancevic, Arlington Heights, IL (US)

(73) Assignee: Acorn Engineering Company, City of Industry, CA (US)

( * ) Notice: Subject to any disclaimer, the term of this patent is extended or adjusted under 35 U.S.C. 154(b) by 741 days.

(21) Appl. No.: 13/987,412

(22) Filed: Jul. 23, 2013

(65) Prior Publication Data
US 2015/0028112 A1    Jan. 29, 2015

(51) Int. Cl.
*G05D 23/13* (2006.01)
*G05D 23/185* (2006.01)
*G05D 23/02* (2006.01)

(52) U.S. Cl.
CPC ......... *G05D 23/1346* (2013.01); *G05D 23/02* (2013.01); *G05D 23/1852* (2013.01); *G05D 23/1856* (2013.01); *G05D 23/021* (2013.01); *G05D 23/022* (2013.01)

(58) Field of Classification Search
CPC ............. G05D 23/185; G05D 23/1852; G05D 23/1856; G05D 23/01; G05D 23/02; G05D 23/021; G05D 23/022
USPC .................. 236/12.1, 12.11, 12.16, 99 K
See application file for complete search history.

(56) References Cited

U.S. PATENT DOCUMENTS

| | | | |
|---|---|---|---|
| 3,685,728 A * | 8/1972 | Chapou | G05D 23/1353 236/12.2 |
| 3,967,781 A * | 7/1976 | Kunz | F25B 41/062 137/543.23 |
| 6,726,110 B2 | 4/2004 | Heinzelmann | |
| 6,793,145 B2 | 9/2004 | Costa e Silva | |
| 7,850,088 B2 | 12/2010 | Wei et al. | |
| 7,913,926 B2 | 3/2011 | Goncze | |
| 2003/0089787 A1* | 5/2003 | Goncze | G05D 23/134 236/12.2 |
| 2004/0046037 A1 | 3/2004 | Swadling | |
| 2004/0089728 A1 | 5/2004 | Nember | |
| 2005/0139688 A1 | 6/2005 | Yang | |
| 2006/0231637 A1* | 10/2006 | Schmitt | B01F 5/0268 236/12.11 |
| 2008/0093470 A1 | 4/2008 | Qingjun | |
| 2010/0147963 A1* | 6/2010 | Goncze | G05D 23/1353 236/12.16 |
| 2012/0024968 A1 | 2/2012 | Beyerle et al. | |
| 2012/0145801 A1 | 6/2012 | Menet | |

* cited by examiner

*Primary Examiner* — Frantz Jules
*Assistant Examiner* — Daniel C Comings
(74) *Attorney, Agent, or Firm* — Eric J. Sosenko; Jonathan P. O'Brien; Honigman Miller Schwartz and Cohn LLP

(57) ABSTRACT

Embodiment thermostatic valves are protected against damage to the wax motor from the leakage of hot water into the valve when the hot water inlet is closed. Embodiments include an improved temperature motive means with fewer parts than conventional valves and with an improved sealing relation between the wax motor/shuttle and the water ports.

6 Claims, 6 Drawing Sheets

THERMOSTATIC MIXING VALVE

BACKGROUND OF THE INVENTION

Field of the Invention

Embodiments include thermostatic mixing valves which mix fluids of dissimilar temperatures with temperature motive means and with a reciprocating valve.

Conventional thermostatic mixing valves have a wax motor or other temperature responsive device which is attached to the shuttle or reciprocating valve. Occasionally with such valves there is a leakage of hot water into the mixing chamber even though the hot water port has been closed by the shuttle. If the valve has no provisions for this scenario, the wax motor is unable to expand, which causes damage to the wax motor and may make the thermostatic valve ineffective. Conventional arrangements to avoid this issue can be seen in U.S. Pat. Nos. 6,726,110; 7,913,926; and 6,315,210. Embodiments of the present disclosure have wax motors and shuttles arranged in a new configuration in which the motors are not attached to the shuttles, thus avoiding such damage to the thermostatic valve when the motor is in an overload condition.

In addition, embodiment valves have fewer parts than conventional valves, thereby simplifying manufacture, increasing reliability, and reducing costs, as well as allowing better control of the temperature of the mixed water from the valve through improvement of the sealing effect of the shuttle within the valve.

The foregoing examples of the related art and limitations related therewith are intended to be illustrative and not exclusive. Other limitations of the related art will become apparent to those of skill in the art upon a reading of the specification and a study of the drawings.

BRIEF SUMMARY OF THE INVENTION

Embodiments include a thermostatic mixing valve which comprises a body with a mixing chamber. A cold water path comprises a cold water inlet, cold water conduit, a circumferential cold water port, and a circumferential cold water seat on the upper edge of the cold water port, the cold water port and cold water seat located on the wall of the mixing chamber. A hot water path comprises a hot water inlet, hot water conduit, a circumferential hot water port, and a circumferential hot water seat located on the lower edge of the hot water port, the hot water port and hot water seat located on the wall of the mixing chamber below the cold water port and cold water seat. A mixed water path comprises a mixing chamber and a mixed water outlet. There is shuttle with on its upper circumference a cold water lip and on its lower circumference a hot water lip. The shuttle has a lumen with a shoulder, and the shoulder has an upper surface and a lower surface. A cylindrical wax motor comprising a wax motor stem and a wax motor body, the body having a shoulder with an upper surface and a lower surface, is inserted into the shuttle lumen with the wax motor shoulder upper surface in contact with the shuttle shoulder lower surface and the wax motor not connected to the shuttle. A shuttle spring is in contact with the shuttle shoulder upper surface and biases the shuttle toward the wax motor body. A wax motor spring is in contact with the wax motor shoulder lower surface and biases the wax motor body toward the shuttle.

Embodiments include the temperature motive means of a thermostatic mixing valve which comprises a tubular shuttle having a lumen and a shoulder on the lumen, and a cylindrical wax motor having a shoulder. The wax motor is located within the shuttle lumen with the motor shoulder in contact with the shuttle shoulder, and the motor and the shuttle are not connected to each other.

Embodiments include the temperature motive means of a thermostatic mixing valve which comprises a tubular shuttle having a cold water seat and a hot water seat on the outer surface of the shuttle, the shuttle having a lumen with a shoulder within the lumen, and the shuttle shoulder has an upper surface and a lower surface. The shuttle shoulder upper surface is capable of being biased downward in the mixing valve by a shuttle spring. There is a cylindrical wax motor with a shoulder on the circumference of the wax motor and the wax motor shoulder has an upper surface and a lower surface. The wax motor lower surface is capable of being biased upward in the mixing valve by a wax motor spring. The wax motor is capable of being inserted into the shuttle lumen with the wax motor shoulder upper surface in contact with the shuttle lumen lower surface and the wax motor is not connected to the shuttle.

The following embodiments and aspects thereof are described and illustrated in conjunction with systems, tool and methods which are meant to be exemplary and illustrative, not limiting in scope. In various embodiments, one or more of the above-described problems have been reduced or eliminated, while other embodiments are directed to other improvements.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

DETAILED DESCRIPTION OF THE INVENTION

Figure 1:
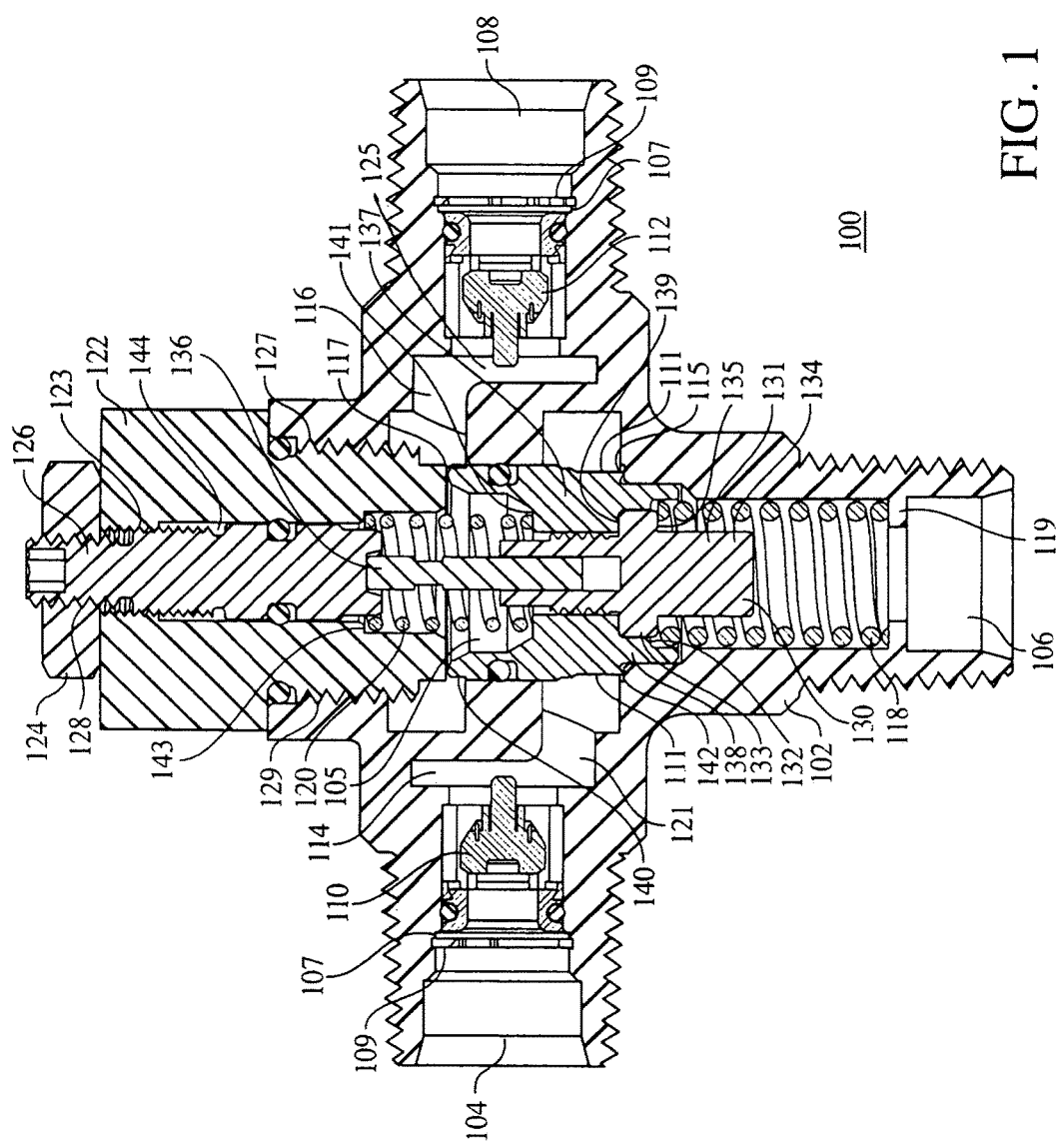
FIG. 1 is a cross-sectional view of an embodiment thermostatic mixer valve.

FIG. 1 is a cross-sectional view of an embodiment thermostatic mixer valve 100. The valve includes a cruciform or cross-shaped body 102 with a hot water inlet 104 and a cold water inlet 108 on opposed arms, and a bonnet 122 with a temperature adjustment stem 126 at the top of the valve and a mixed water outlet 106 at the bottom of the valve. A cylindrical mixing chamber 105 extends from the mixed water outlet 106 to the bottom of the bonnet 122.

An optional hot water check valve 110, optional filter 107, and optional retaining ring 109 is located adjacent to the hot water inlet 104. A hot water path 114 comprises the hot water inlet 104, hot water conduit 121, hot water port 111 and hot water seat 115. Both the hot water port 111 and the hot water seat 115 extend about the circumference of the mixing chamber 105. The hot water seat 115 is located on the bottom of the hot water port 111 and the seat extends slightly into the mixing chamber 105.

An optional cold water check valve 112, optional filter 107, and optional retaining ring 109 is located adjacent to the cold water inlet 108. A cold water path 116 comprises the cold water inlet 108, cold water conduit 125, cold water port 113 and cold water seat 117. Both the cold water port 113 and the cold water seat 117 extend about the circumference of the mixing chamber 105. The cold water seat 117 is located on the bottom of the cold water port 113.

The cold water port 113 is located above the hot water port 111 on the wall of the mixing chamber 105.

A bonnet 122 is attached to the top of the body 102 by complementary threads 129 in the top of the body 105 and threads 127 in the sides of the bonnet 122. A bonnet bore 144 penetrates the bonnet 122. A bonnet ledge 143 is on the inner surface of the bore 144. A temperature adjustment stem 126 extends through the bonnet bore 144 and is attached by stem threads 128 to internal bonnet threads 123. Rotation of the temperature adjustment stem 126 causes the stem to advance into or retract from the mixing chamber 105. A locking nut 124 secures the temperature adjustment stem in the desired position.

In embodiments, the temperature motive means 131 includes a wax motor 130, shuttle 138, shuttle spring 120, and motor spring 118.

The wax motor 130 consists of a wax motor stem 136 and wax motor body 134 with a shoulder 132 about the circumference of the body. The shoulder 132 has a wax motor shoulder upper surface 133 and a wax motor shoulder lower surface 135.

The shuttle 138 has a cylindrical shape with a shoulder 137 on the lumen with a shoulder upper surface 141 and a shoulder lower surface 139. A shuttle cold water lip 140 is on the upper edge of the cylindrical shuttle 138. A shuttle hot water lip 142 is on the lower edge of the cylindrical shuttle 138. The shuttle cold water lip 140 interacts with the cold water seat 117 to close the cold water port 113. The shuttle hot water lip 142 interacts with the hot water seat 115 to close the hot water port 111.

The shuttle 138 is inserted into the mixing chamber 105. The wax motor 130 is located within the shuttle 138 lumen with the wax motor shoulder upper surface 133 in contact with the shuttle shoulder lower surface 139. The wax motor stem 136 is in contact with the temperature adjustment stem 126. A motor spring 118 is supported at one end by a motor spring retaining rib 119 at the mixed water outlet 106 and the other end is in contact with the wax motor shoulder lower surface 135. The motor spring 118 biases the wax motor 130 upward toward the temperature adjustment stem 126. The shuttle spring 120 is supported at one end by the bonnet ledge 143 and the other end of the spring 120 bears on the shuttle shoulder upper surface 141. The shuttle spring 120 biases the shuttle 138 downward toward the mixed water outlet 106.

Figure 2:
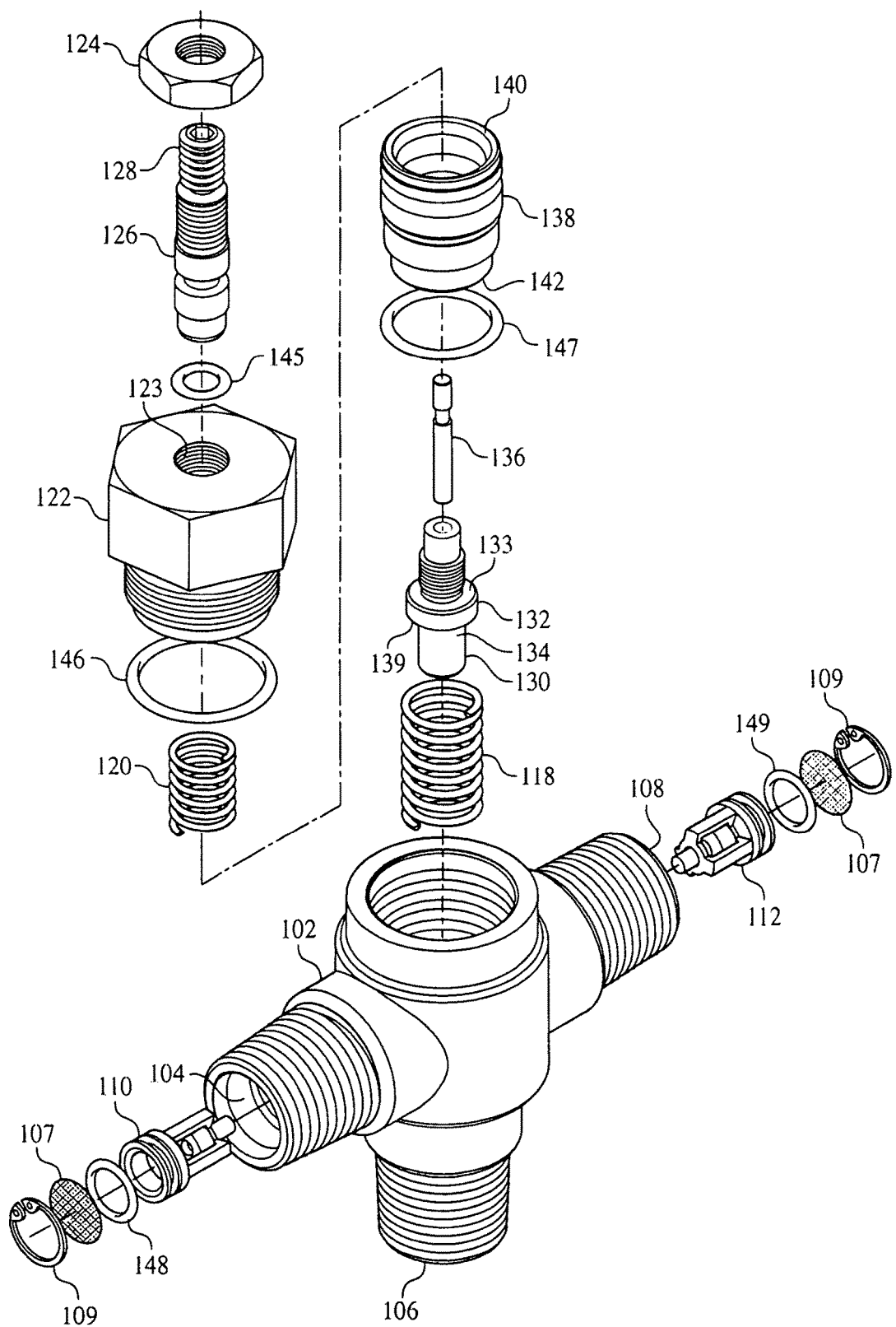
FIG. 2 is an exploded cross-sectional view of an embodiment thermostatic mixer valve.

FIG. 2 is an exploded cross-sectional view of an embodiment thermostatic mixer valve. Visible in FIG. 2 are the body 102 with hot water inlet 104, mixed water outlet 106, cold water inlet 108. Also visible is the optional hot water check-valve 110 and optional cold water check valve 112, and the optional filters 107 and retainer rings 109 as well as the optional hot water check valve O-ring 148 and the optional cold water check valve O-ring 149.

Also visible is the motor spring 118 which fits into the bottom of the mixing chamber 105 and is held in place by the motor spring retaining rib 119.

The wax motor 130 is shown with wax motor body 134, wax motor shoulder 132 with a wax motor shoulder lower surface 139 and wax motor shoulder upper surface 141 and wax motor stem 136.

The shuttle 138 is shown with shuttle cold water lip 140, shuttle hot water lip 142, shuttle shoulder 137, shuttle shoulder lower surface 139, shuttle shoulder upper surface 141 and shuttle O-ring 147.

Also visible is the shuttle spring 120, whose upper end rests on the bonnet ledge 143 and lower end on the shuttle shoulder upper surface 141.

Also visible is the bonnet 122 with bonnet O-ring 146. Also visible is the temperature adjusting stem 126 with stem threads 128 which interact with bonnet threads 123 and the stem O-ring 145.

A locking nut 124 at the top of the thermostatic valve secures the position of the temperature adjusting stem 126.

Figure 3:
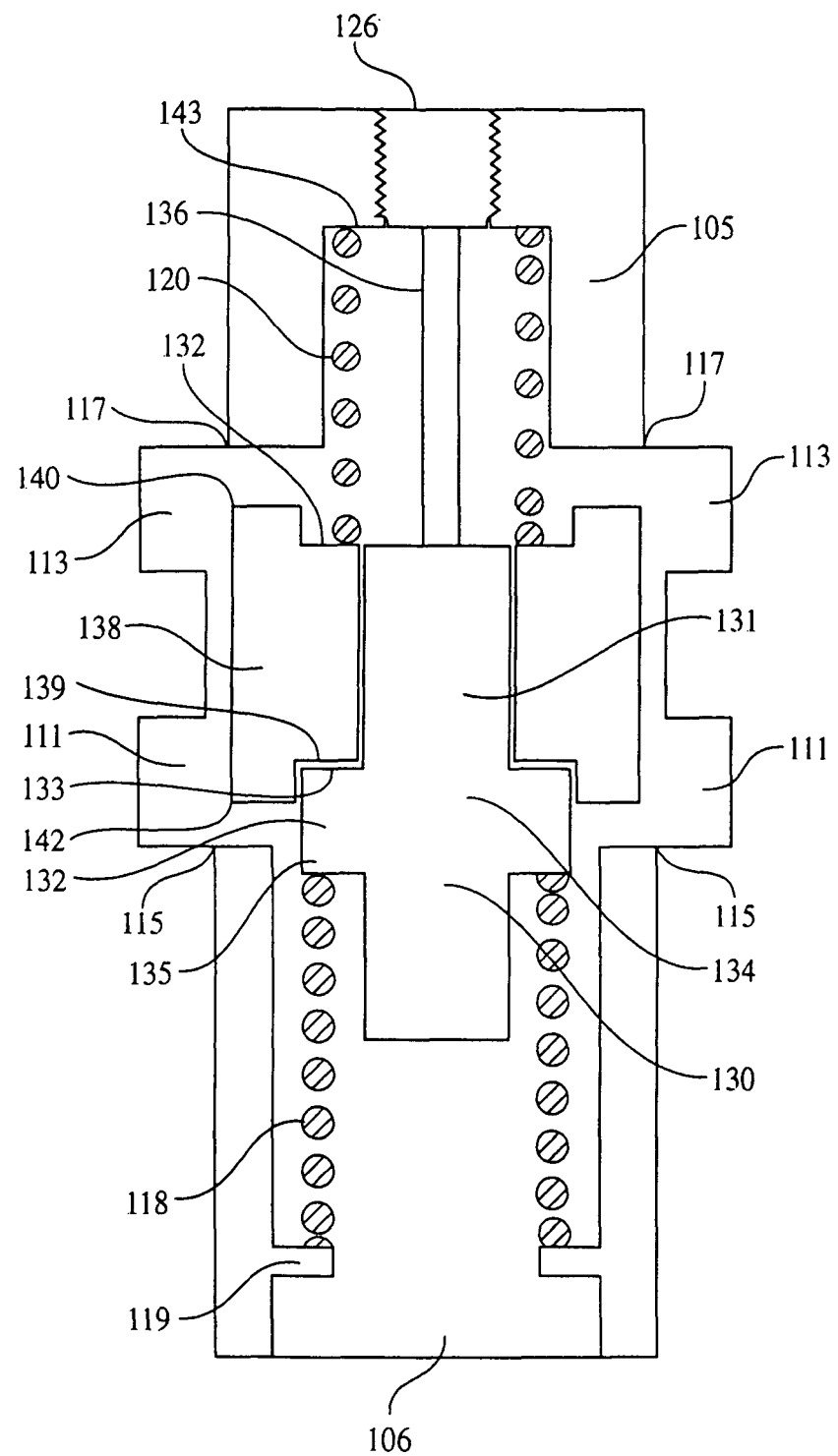
FIG. 3 is a diagrammatic cross-sectional view of an embodiment thermostatic mixer valve with exaggerated elements with flow of both hot and cold water through the valve.

FIG. 3 is a diagrammatic cross-sectional view of an embodiment thermostatic mixer valve with exaggerated elements in a position with flow of both hot and cold water through the valve.

Visible in FIG. 3 are the elements temperature adjustment stem 126, cold water port 113, cold water seat 117, hot water port 111, hot water seat 115, motor spring retaining rib 119, and mixed water outlet 106.

Also visible are the elements of the temperature motive means 131 consisting of wax motor 130 with wax motor stem 136, wax motor body 134, wax motor shoulder 132, wax motor shoulder upper surface 133, wax motor shoulder lower surface; shuttle 138 with cold water lip 140, hot water lip 142, shoulder lower surface 139; shuttle spring 120, and motor spring 118.

In operation, the clockwise rotation of the temperature adjustment stem advances the shuttle and moves the shuttle downward, and correspondingly reduces the temperature of the water from the thermostatic valve. The position of the shuttle controls the relative flow of water from the hot and cold ports. The position of the shuttle 138, and thus the temperature of mixed water from the thermostatic valve, can be controlled or pre-set by setting the shuttle position by advancing or retracting the temperature adjustment stem 126 into or out of the mixing chamber 105. Moving of the shuttle 138 down compresses the wax motor spring 118. Moving the shuttle 138 up compresses the shuttle spring 120. In embodiments, clockwise rotation of the temperature adjustment stem advances the shuttle, moves the shuttle downward, and correspondingly reduces the temperature of the water from the thermostatic valve. Clockwise rotation of the temperature adjustment stem retracts the shuttle, moves the shuttle upward, and correspondingly increases the temperature of the water from the thermostatic valve.

The position of the shuttle 138 is maintained in equilibrium by the interaction of the shuttle spring 120 and the wax motor spring 118 on the shuttle 138 and wax motor 130, respectively. The shuttle spring bears on one end against the bonnet ledge 143 and on the other end against the shuttle shoulder upper surface 141. The shuttle shoulder lower surface 139 is thusly pressed into contact with the wax motor shoulder upper surface 133. The wax motor 130 is urged upward by the wax motor spring 118 which presses on the wax motor shoulder lower surface 135 at one end and is restrained at the other end by the motor spring retaining rib 119.

Changes in the temperature or pressure of incoming hot or cold water causes a responds from the temperature motive means 131 which restores the preset temperature.

If the hot or cold input water becomes colder the wax motor stem 136 retracts and the shoulder 132 of the wax motor body 134 moves upward, the wax motor spring 118 expands, and the shuttle spring 120 is compressed. Movement of the shuttle 138 upward reduces the opening size of the cold water port 113 and, if continued, closes the cold water port 113 through contact of the shuttle cold water lip 140 and the cold water seat 117 located on the top edge of the cold water port 113. Simultaneously, movement of the shuttle 138 upward increases the opening size of the hot water port 111 and, if continued, completely opens the hot water port 111. Thus the position of the shuttle is controlled by the wax motor and the temperature of water emerging from the thermostatic mixer is returned to the preset value.

Conversely, if the hot or cold input water becomes hotter the wax motor stem 136 extends and the shoulder 132 of the wax motor body 134 moves downward, the wax motor spring 118 is compressed, and the shuttle spring 120 is expanded, providing the motivation to move the shuttle 138 downward. Movement of the shuttle 138 downward increases the opening size of the cold water port 113 and, if continued, completely opens the cold water port 113. Simultaneously, movement of the shuttle 138 downward decreases the opening size of the hot water port 111 and, if continued, completely closes the hot water port 111 through contact of the shuttle hot water lip 142 and the hot water seat 115 located on the lower edge of the hot water port 111. Thus the position of the shuttle is controlled by the wax motor and the temperature of water emerging from the thermostatic mixer is returned to the preset value.

Figure 4:
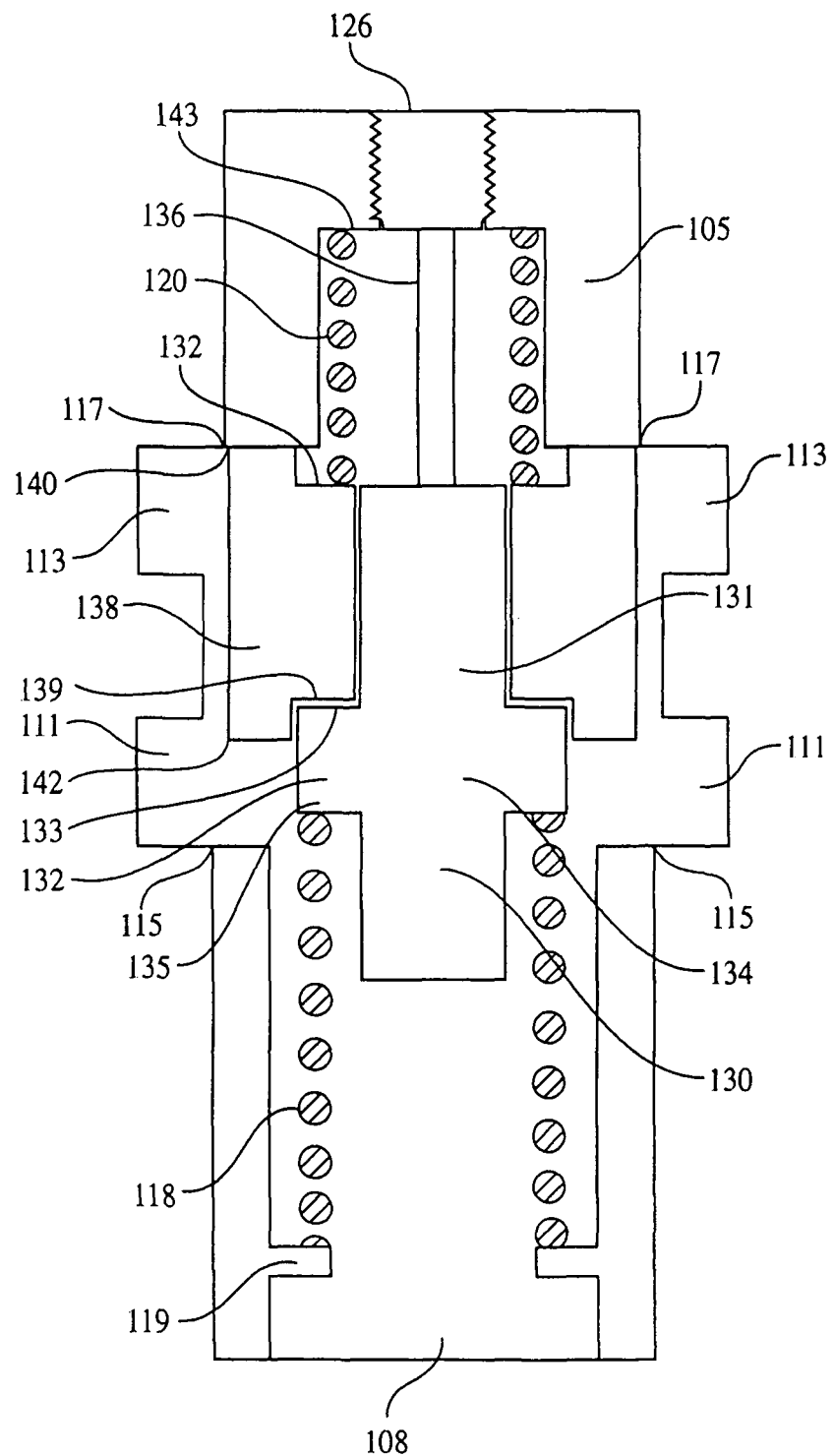
FIG. 4 is a diagrammatic cross-sectional view of an embodiment thermostatic mixer valve with exaggerated elements with flow of hot water only through the valve.

FIG. 4 is a diagrammatic cross-sectional view of an embodiment thermostatic mixer valve with exaggerated elements with flow of hot water only through the valve. The elements shown in FIG. 4 are the same as those in FIG. 3. In FIG. 4 the temperature of the incoming hot and or cold water had dropped below the preset value. The wax motor stem 136 has retracted and also is urged upward by the wax motor spring 118. The wax motor shoulder upper surface 133 presses against the shuttle shoulder lower surface 139 and moves the shuttle 138 upward, with compression of the shuttle spring 120. The upward movement of the shuttle 138 closes the cold water port 113 by contact of the shuttle cold water lip 140 with the cold water seat 115. In addition, upward movement of the shuttle 138 opens the hot water port 111.

Figure 5:
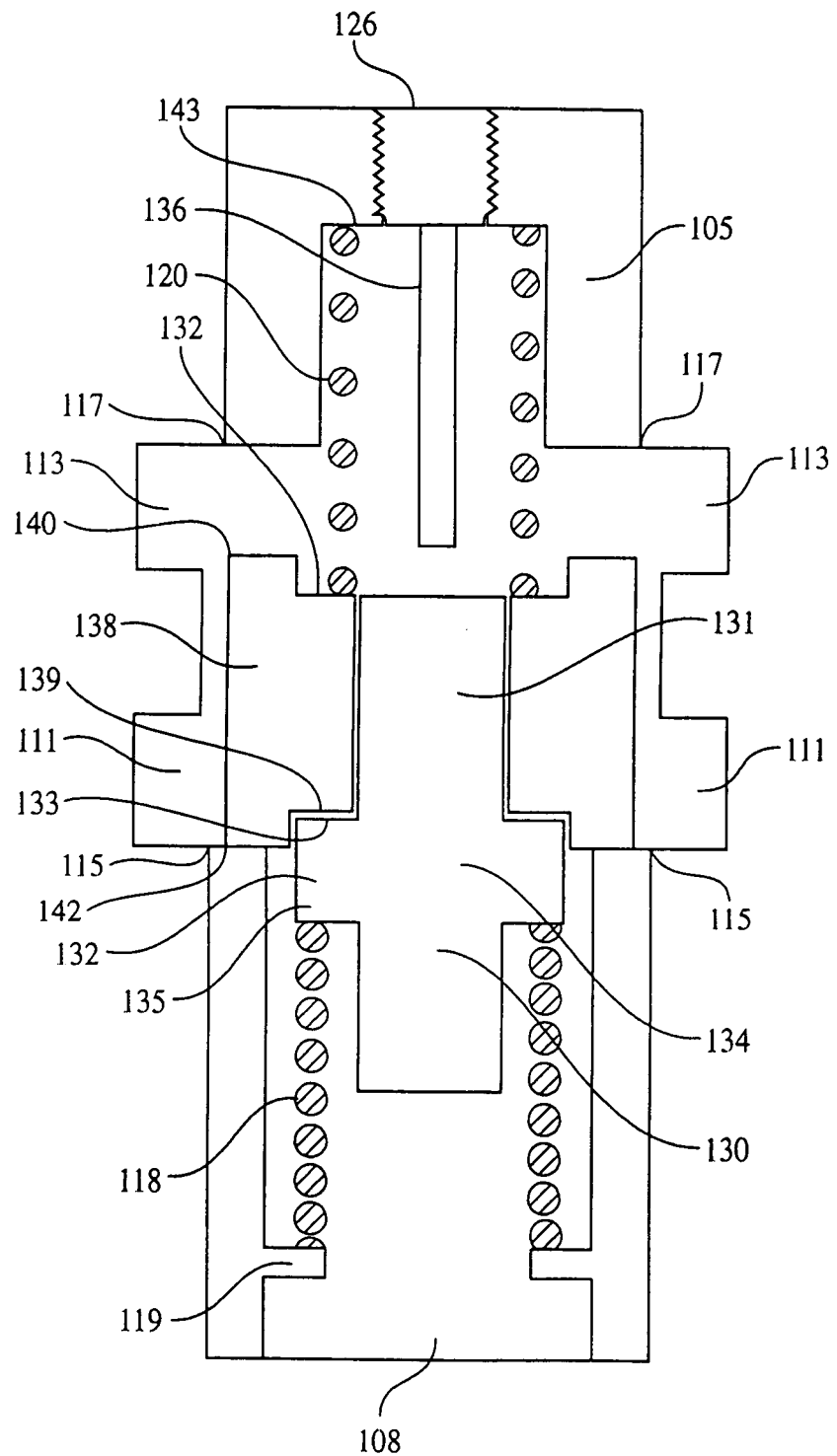
FIG. 5 is a diagrammatic cross-sectional view of an embodiment thermostatic mixer valve with exaggerated elements with flow of cold water only through the valve.

FIG. 5 is a diagrammatic cross-sectional view of an embodiment thermostatic mixer valve. The elements shown in FIG. 5 are the same as those in FIG. 3. In FIG. 5 the temperature of the incoming hot and or cold water had risen above the preset value. The wax motor stem 136 has expanded and also is urged downward by the shuttle spring 118. The shuttle shoulder lower surface 139 presses against the wax motor shoulder upper surface 133 and moves the shuttle 138 downward, with compression of the wax motor spring 118. The downward movement of the shuttle 138 opens the cold water port 113. In addition, downward movement of the shuttle 138 closes the hot water port 111 by contact of the shuttle how water lip 142 with the hot water seat 115. A slight protrusion of the hot water seat 115 into the mixing chamber 105 prevents movement of the shuttle hot water lip 142 beyond the hot water seat 115.

Figure 6:
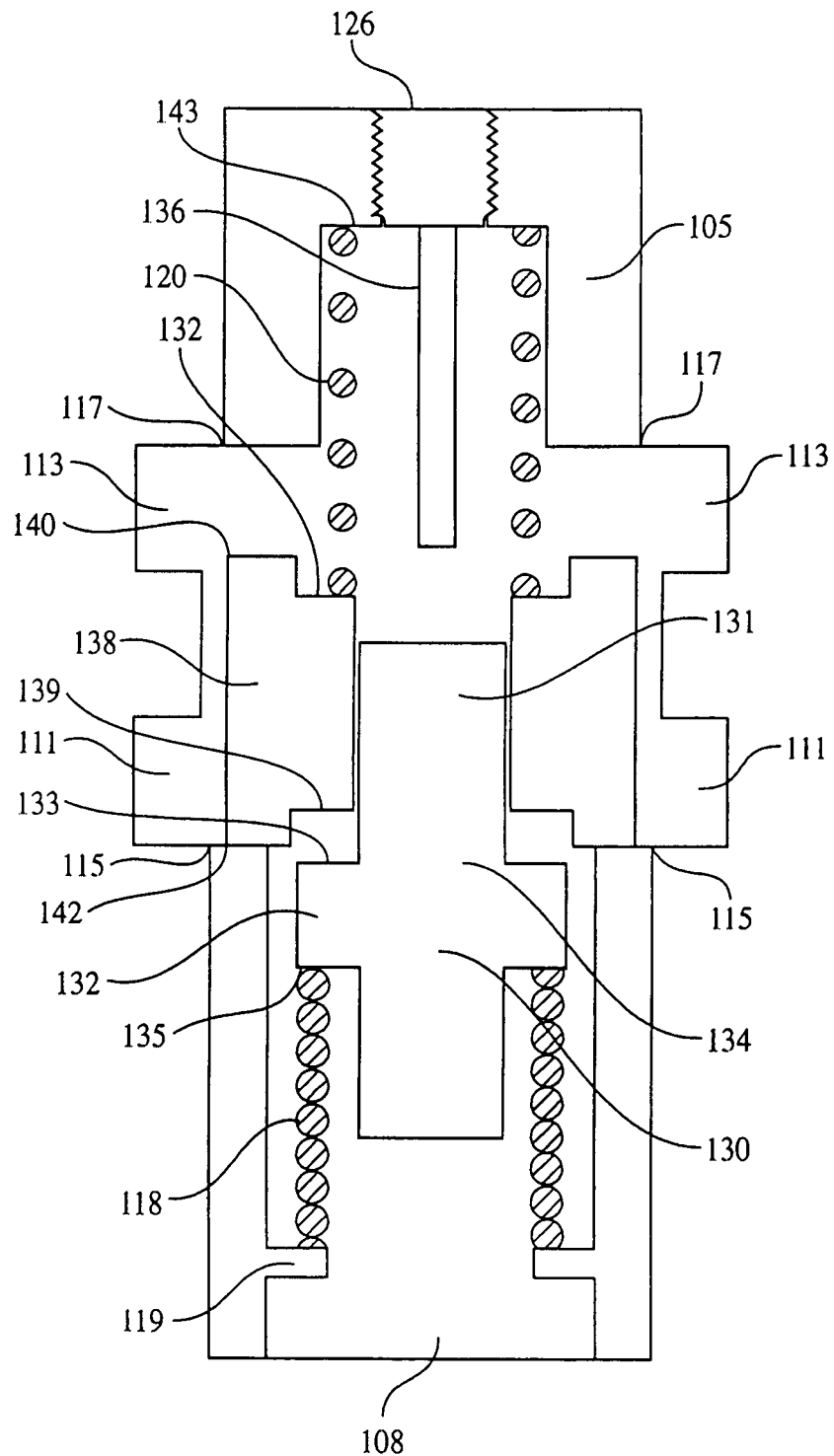
FIG. 6 is a diagrammatic cross-sectional view of an embodiment thermostatic mixer valve with exaggerated elements with flow of cold water only through the valve under conditions of excessive hot water in the thermostatic valve.

FIG. 6 is a diagrammatic cross-sectional view of an embodiment thermostatic mixer valve with exaggerated elements with flow of cold water only through the valve under conditions of excessive hot water in the thermostatic valve. The elements shown in FIG. 6 are the same as those in FIG. 3. The conditions in FIG. 6 are the same as for FIG. 5. A slight protrusion of the hot water seat 115 into the mixing chamber 105 prevents movement of the shuttle hot water lip 142 beyond the hot water seat 115. In addition, despite the fact that the hot water port 111 has been closed there has been either leakage of hot water from the hot water port 111 into the mixing chamber 105 or the temperature of the cold water supply has increased. This infusion of hot water has caused the wax motor body 134 to expand, separating the contact between the shuttle shoulder lower surface 139 and the wax motor shoulder upper surface 133, and compressing the wax motor spring 118.

The fact that the wax motor 130 is not attached to the shuttle 138 allows accommodation of excessive expansion of the wax motor 130 without damage to the wax motor 130 or shuttle 138 and allows unimpaired functioning of the thermostatic valve when normal conditions are restored.

Embodiments therefore can remain functional despite conditions which cause irreparable damage without the need of a preloaded spring assembly.

Embodiments of the non-wax motor elements are manufactured of suitable hard, non-porous, strong materials such as bronze, steel, stainless steel, and iron. Embodiment wax motors are manufactured of paraffin wax with molecules of a narrow range of carbon chain lengths, allowing expansion and retraction of the wax motor stem within a predetermined temperature range.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. The applicant or applicants have attempted to disclose all the embodiments of the invention that could be reasonably foreseen. There may be unforeseeable insubstantial modifications that remain as equivalents.

We claim:

1. A thermostatic mixing valve comprising:
   a body,
   a mixing chamber having a wall located in the body
   a cold water path comprising a cold water inlet, cold water conduit, a circumferential cold water port, and a circumferential cold water seat on the upper edge of the cold water port, the cold water port and cold water seat located on the wall of the mixing chamber,
   a hot water path comprising a hot water inlet, hot water conduit, a circumferential hot water port, and a circumferential hot water seat located on the lower edge of the hot water port, the hot water port and hot water seat located on the wall of the mixing chamber below the cold water port and cold water seat,
   a mixed water path comprising the mixing chamber and a mixed water outlet,
   a shuttle having on its upper circumference a cold water lip and on its lower circumference a hot water lip,
   the shuttle having a lumen with a shoulder,
   the shoulder having an upper surface and a lower surface,
   a cylindrical wax motor comprising a wax motor stem extending from a wax motor body, the wax motor body further having a wax motor shoulder radially projecting therefrom and defining an upper surface and a lower surface, the wax motor body being axially slideable relative to the shuttle operation of the mixing valve, the wax motor shoulder upper surface in contact with the shuttle shoulder lower surface, the wax motor not connected to the shuttle, a shuttle spring in contact with the shuttle shoulder upper surface and biasing the shuttle toward the wax motor body, and a wax motor spring in contact with the wax motor shoulder lower surface and biasing the wax motor body toward the shuttle.

2. The thermostatic mixing valve of claim 1 wherein the cold water path further comprises a cold water check valve.

3. The thermostatic mixing valve of claim 1 wherein the hot water path further comprises a hot water check valve.

4. The thermostatic mixing valve of claim 1 further comprising a motor spring retaining rib attached to the mixing chamber.

5. The thermostatic mixing valve of claim 1 further comprising a bonnet attached to the body.

6. The thermostatic mixing valve of claim 5 further comprising a temperature adjustment stem attached to the bonnet.

\* \* \* \* \*